US006853694B1

United States Patent
Beaudin et al.

(10) Patent No.: US 6,853,694 B1
(45) Date of Patent: Feb. 8, 2005

(54) SPATIAL DIVERSITY WIRELESS COMMUNICATIONS (RADIO) RECEIVER

(75) Inventors: André Beaudin, Boucherville (CA); Richard Vallée, Dorval (CA); Michel D. Martin, Oka (CA)

(73) Assignee: Dataradio Inc., Quebec (CA)

(*) Notice: Subject to any disclaimer, the term of this patent is extended or adjusted under 35 U.S.C. 154(b) by 746 days.

(21) Appl. No.: 09/626,593

(22) Filed: Jul. 27, 2000

(30) Foreign Application Priority Data

Aug. 9, 1999 (CA) ............................................ 2279774

(51) Int. Cl.[7] ................................................. H04L 1/02
(52) U.S. Cl. ...................... 375/347; 375/349; 455/134; 455/138; 455/273
(58) Field of Search ............................... 375/347, 144, 375/148, 267, 346, 349; 455/133, 134, 137, 138, 272, 273

(56) References Cited

U.S. PATENT DOCUMENTS

| 4,742,563 | A |   | 5/1988  | Fukumura            |
|-----------|---|---|---------|---------------------|
| 4,972,434 | A |   | 11/1990 | Le Polozec et al.   |
| 5,280,637 | A |   | 1/1994  | Larosa et al.       |
| 5,402,451 | A | * | 3/1995  | Kaewell et al. ............. 375/347 |
| 5,499,272 | A |   | 3/1996  | Bottomley           |
| 5,530,925 | A | * | 6/1996  | Garner ........................ 455/273 |
| 5,640,695 | A |   | 6/1997  | Fitzgerald          |
| 5,701,333 | A |   | 12/1997 | Okanoue et al.      |
| 5,710,995 | A |   | 1/1998  | Akaiwa et al.       |
| 5,862,192 | A |   | 1/1999  | Huszar et al.       |
| 5,901,174 | A |   | 5/1999  | Richard             |
| 6,219,192 | B1| * | 4/2001  | Gopalaswamy et al. ...... 360/25 |

FOREIGN PATENT DOCUMENTS

EP         0 637 878 A2    8/1994

\* cited by examiner

*Primary Examiner*—Khai Tran
*Assistant Examiner*—David B. Lugo
(74) *Attorney, Agent, or Firm*—Workman Nydegger

(57) ABSTRACT

A combiner for use in a spatial diversity radio receiver which receives multiple data signals through spaced apart antennae. The combiner includes a receiving component configured for receiving strength-indicative signals, each strength-indicative signal being indicative of the strength of one of the received data signals, and demodulated data signals. A control signal generating component configured for generating control signals generates control signals responsive to the strength-indicative signals. A combining component configured for combining signals combines, in linear proportions determined by the control signals, those of the demodulated data signals which are both above a predetermined strength threshold level ("combiner threshold") and differ in strength by less than a predetermined margin of preferably between 3 dB and 12 dB (e.g. 6 dB) to provide a combined output data signal. When more than the margin separates the signal strengths, only the strongest signal is used. A spatial diversity wireless communications (radio) receiver includes multiple receiving components having spaced-apart antennae, each receiving component providing both a signal indicative of received signal strength and a demodulated signal output, a combiner as aforesaid to provide an output data signal and means for evaluating the output data signal. Preferably, rapidly-fading signals are identified by evaluating second derivative signals of the strength-indicative signals, and weighted accordingly if a non-fading signal is available.

13 Claims, 4 Drawing Sheets

SPATIAL DIVERSITY WIRELESS COMMUNICATIONS (RADIO) RECEIVER

FIELD OF THE INVENTION

This invention relates to spatial diversity wireless communications (radio) receivers, particularly for data signals.

BACKGROUND OF THE INVENTION

Land mobile radio systems as used for dispatch applications, and also many wireless cellular systems, use frequency modulation which has proven to be well suited to the application by reason of immunity to impulse noise which is common in the vehicular environment. Such systems are increasingly being required to transmit data as well as analog speech and advances in computer technology have increased the demand for higher bit rates for data transfer.

Radio frequencies are regulated. While demands for higher bit rates are wide spread, regulatory agencies have not increased the bandwidth needed to facilitate high speed data transmission. In fact, the trend is in the opposite direction. In 1997 the Federal Communications Commission mandated the use of channels which are one half or one quarter as wide as those previously authorized. As taught by Shannon and Nyquist, there is a proven relationship between the bit rate of a channel, the bandwidth of the channel and the signal to noise ratio required to decode the data accurately. As the bit rate increases, all else being equal, the signal to noise ratio required to decode the data is also increased, and thus the range of the radio system is reduced as the bit rate increases.

Land mobile and cellular channels differ from those used in fixed microwave point to point services and satellite systems by virtue of reflections and fading of the signals. Signals arriving at or from a wireless communications device such as a mobile radio receiver or cellular telephone are almost always comprised of a complex amalgam of waves, some directly from the sending antenna and others reflected from stationary and moving objects. In the worst case scenario, the total received signal is composed of reflected signals. The resulting waveform caused by the combination of reflected signals (worse case) and/or direct signal plus reflected signals, is subject to cancellation or reinforcement in the amplitude domain as well as distortion in the time domain resulting from propagation delays over the varying length paths taken by reflected signals. Both the amplitude and time distortions make decoding of the signals more difficult. It is not uncommon for cancellation to reduce the incoming signal to a level far below the threshold required for reliable decoding by the receiver. This effect is referred to as multi-path fading.

In data systems, such cancellations or "drop outs" erase portions of the desired bit stream. The duration of the erasure is a function of the average signal strength, the wavelength of the radio signal, the speed of the vehicle (where the wireless device is being operated in a vehicle) and that of moving reflectors in the vicinity. Forward Error Correction (FEC) is a common technique for solving this erasure problem. Redundant information is added to the transmitted data to allow for a predicted level of erasures and recovery of the original data without retransmission. FEC is useful but as the bit rate increases, more and more redundancy must be added which leads to diminishing returns. The redundancy reduces the effective bit rate of the system.

Another solution to problems caused by multi-path fading is to increase the complexity of the receiving system. Fading can be mitigated by using multiple receivers and multiple antennas. Such systems are often called diversity receivers since they are based on spatial diversity. Two or more receivers with separate antennae spaced an appropriate distance apart from each other so that the received signals are non-correlated give rise to probabilities that destructive interference experienced at one antenna may not be present on another.

Spatial diversity receiving systems generally use one of three different classes of techniques to combine the multiple signals, being: (i) selection combining whereby the best signal is chosen based on assessment of signal strength (i.e. the signal having the best signal-to-noise ratio); (ii) equal gain combining whereby all signals are combined together regardless of the strength of any individual signal; and (iii) optimal combining whereby the signals are combined proportionally based on their individual strengths. Only the latter attempts to make use of the maximum possible information content available from all signals to yield optimal performance. However, in practice, it has been difficult to design combiner circuitry which effectively combines signals on such an optimal basis, the problem being to develop effective and practical algorithms for determining the weights to be applied. Many known optimal combiners use complex equalizers to implement an estimation of the received symbol sequences which is then used to proportionally weight the received signals for combining purposes. Such systems are exemplified by the following patent references.

Each of U.S. Pat. No. 5,499,272 (Bottomley) and U.S. Pat. No. 5,701,333 (Okanoue et al) apply complex estimation algorithms to, in effect, produce a synthesized received data stream. U.S. Pat. No. 5,862,192 (Huszar et al) also applies an estimation algorithm but it compares estimated sequences to sample sequences, and selects received sequences on the basis of this comparison. U.S. Pat. No. 5,901,174 (Richard) applies weightings to the received channels which are derived from channel error estimations based on a global estimation algorithm. Another system, described in U.S. Pat. No. 5,640,695 (Fitzgerald), uses a continuously switching logic control mechanism for audio signals (this being a type of selective combiner). U.S. Pat. No. 4,972,434 (Le Polozec et al) uses an adaptive (feedback type) equalizer to derive a distortion factor which is used to weight signal strength measurements for a combiner such that the distortion factor is based on the combined signal produced by the combiner.

Accordingly, there is a need for an effective means of optimally combining signals in a spatial diversity receiver which is less complex than those of the prior art.

SUMMARY OF THE INVENTION

In accordance with the invention there is provided a combiner for use in a spatial diversity radio receiver which receives multiple data signals through spaced apart antennae. The combiner includes means for receiving strength-indicative signals, each strength-indicative signal being indicative of the strength of one of the received data signals, and demodulated data signals. The combiner provides means for generating control signals responsive to the strength-indicative signals and for combining, in linear proportions determined by the control signals, those demodulated data signals which are both above a predetermined combiner strength threshold level and differ in strength by less than a predetermined margin of preferably between 3 dB and 12 dB, to provide a combined output data signal. The demodulated data signals are thereby combined in proportion to an amount by which they differ relative to the predetermined margin (e.g. 6 dB), and the greatest proportion is of the strongest of the data signals. A digital signal processor preferably provides the generating and combining means. The generating means comprises means for evaluating the strength-indicative signals and, to address the situation of rapid signal fading, the evaluating means may also include means for producing a second derivative signal for each strength-indicative signal whereby the control signal is generated according to a predetermined combination of the strength-indicative signals and second derivative signals. Preferably, the combiner includes adaptive DC bias compensation means to adjust the relative DC levels of the received demodulation data signals, wherein the compensation is always done but the DC level used to do so is only adjusted when both demodulated data signal strengths are above another predetermined threshold level which is referred to herein as the DC bias compensation threshold.

In accordance with a further aspect of the invention there is provided a spatial diversity radio receiver comprising multiple receiving components for receiving data signals through antennae each of which is associated with one of the receiving components and spaced apart from the other antenna(e) a predetermined distance. Each receiving component comprises circuitry for providing a signal indicative of the strength of the received data signal and a demodulated data signal, a combiner according to the foregoing and circuitry for evaluating the combined output data signal.

BRIEF DESCRIPTION OF THE DRAWINGS

Reference will now be made to the accompanying drawings which show, by way of example, a presently preferred embodiment of the present invention, and in which.

DESCRIPTION OF THE ILLUSTRATED PREFERRED EMBODIMENT

Figure 1:
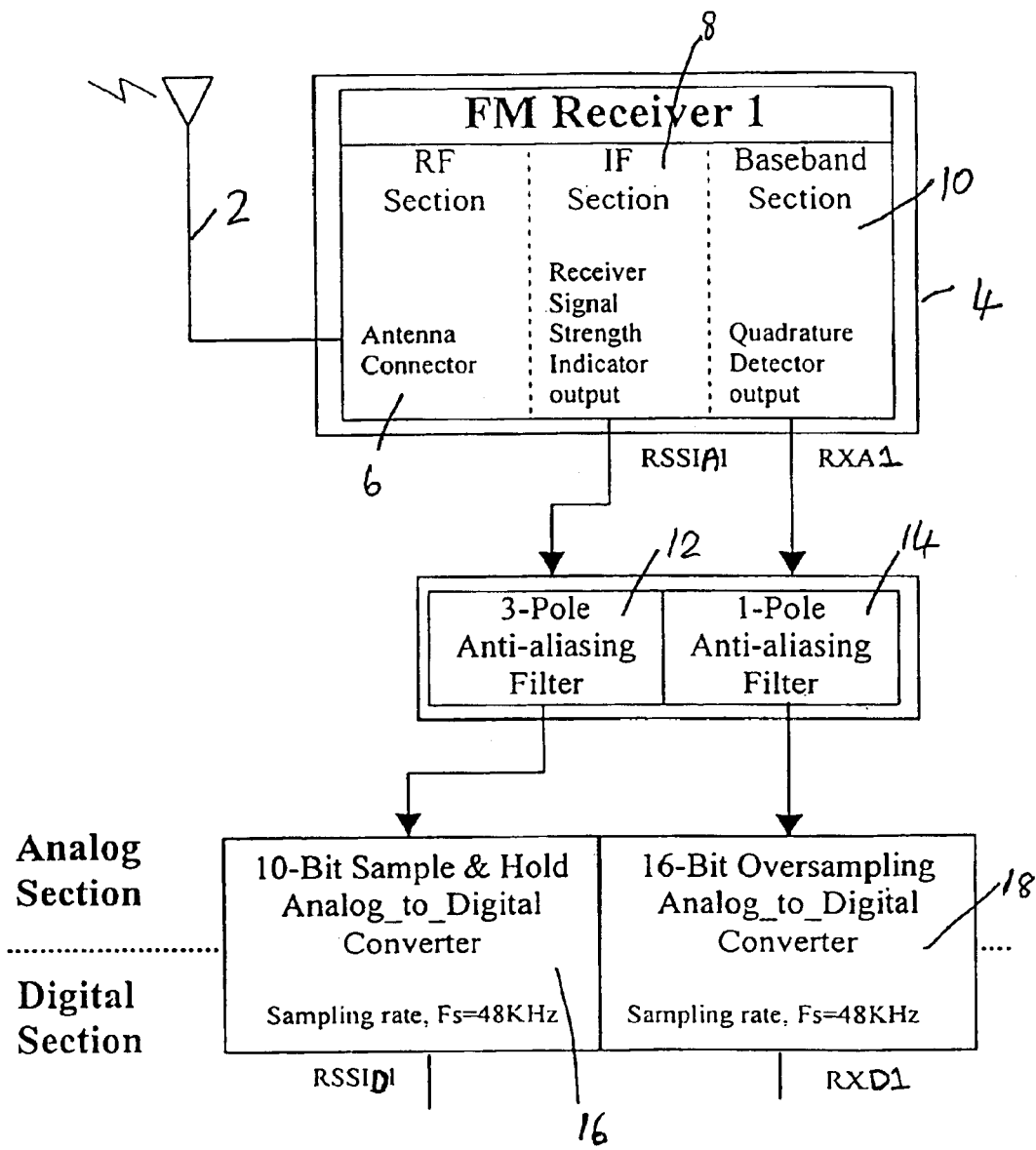
FIG. 1 is a schematic diagram of a first receiving component of a wireless receiver.
Figure 2:
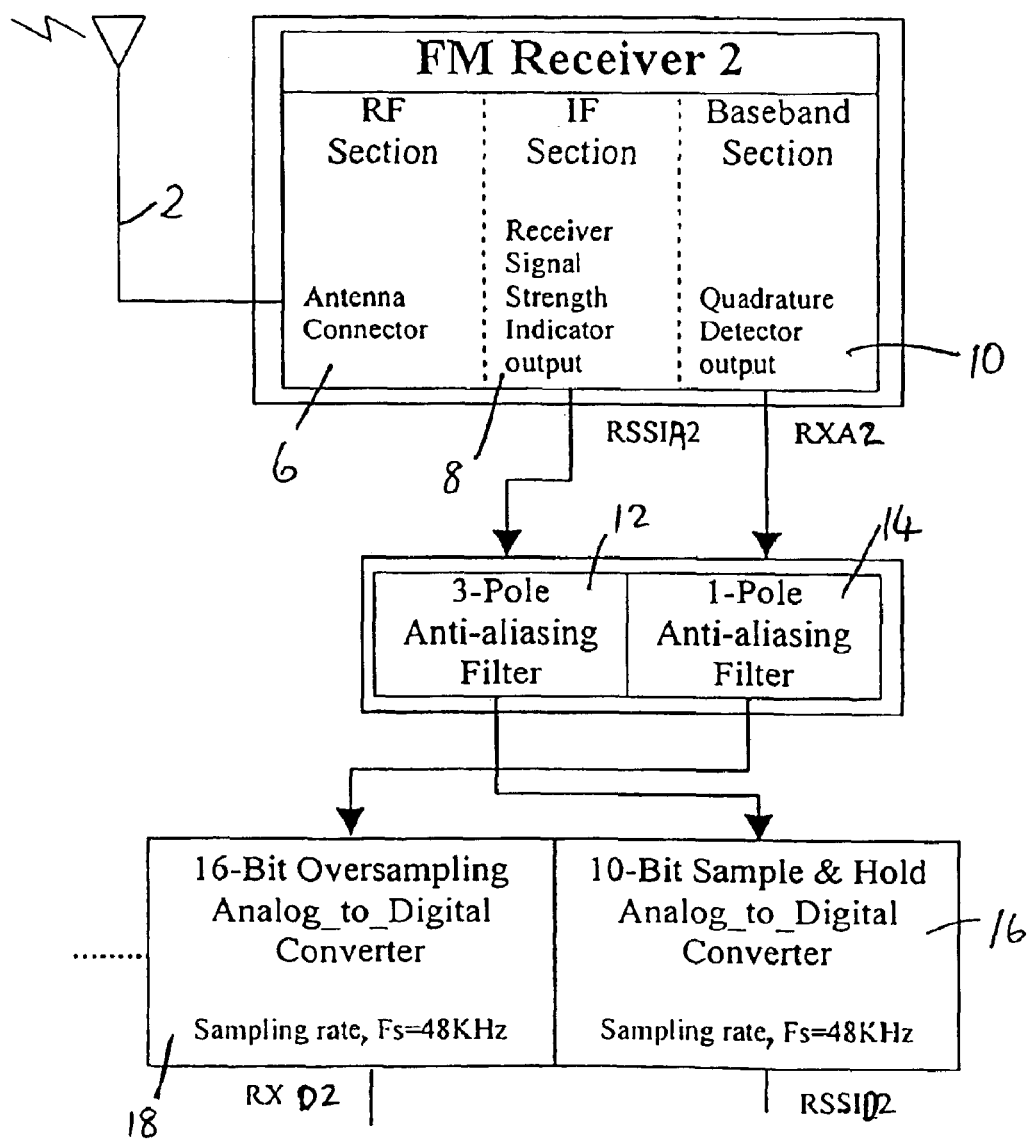
FIG. 2 is a schematic diagram of a second receiving component of a wireless receiver having an antenna spaced apart from that of the first receiving component to result in non-correlation of the signals received thereby.

Referring to FIGS. 1 and 2, the receiving components shown therein may be identical, and the same reference numerals are used to refer to the same parts. Only the signals generated by the two receiving components are differentiated herein by being designated with the suffixes 1 and 2 respectively. While a wireless communications (radio) receiver utilising two receiving components with spaced apart antennas is described herein, it will be understood by persons skilled in the art that similar principles to those described below may be applied to implement the invention in receivers employing three or more receiving components with associated spaced apart antennas. The terms "radio" and "wireless communications" are intended to have the same meaning, and are used interchangeably, herein; they are not intended to be limited to any particular frequency range or modulation scheme.

The receiving components each comprise an antenna 2 and FM receiver 4 which in turn comprises a radio frequency (RF) section 6, an intermediate frequency (IF) section 8, and a baseband section 10 which detects and regenerates a baseband signal (RXA1 and RXA2). The IF sections 8 provide analog radio signal strength indicator (RSSI) signals RSSIA1 and RSSIA2 respectively, conveniently derived by summing stage currents in limiting amplifiers in each IF section, although other known techniques for deriving such signals may be utilised. In this manner, the signal strength is measured on the basis of the power of the signal. However, for another embodiment it might, alternatively, be chosen to use circuitry which measures the signal strength on the basis of the signal amplitude and, in such case, the subsequent circuitry would be required to square the measured value. For the exemplary embodiment, the IF sections are designed so that the RSSI signals exhibit a temperature stable monotonic logarithmic characteristic over a range of greater than 70 dB.

For the illustrated embodiment, the baseband section incorporates an FM detector circuit, in this case being a quadrature detector which splits the IF signal into two parts of which one part passes through a network with a phase shift of 90 degrees plus a shift proportional to the IF deviation from center frequency, while the other part passes straight through; multiplies the shifted and unshifted parts together; and selects the baseband frequency portion of the multiplier output spectrum to provide baseband analog signals RXA1 and RXA2.

The signals RSSIA1, and RSSIA2, RXA1 and RXA2 are passed through respective 3-pole and 1-pole anti-aliasing filters 12 and 14 which limit their bandwidth to exclude noise and components at frequencies of more than half the sampling rate applied in analog to digital converters (ADC) 16 and 18, to which are passed the signals output from the filters 12 and 14. Typically, the ADC 16 used to digitize the RSSIA1 and RSSIA2 signals to produce signals RSSID1 and RSSID2, respectively, is a sample and hold converter which tracks an analog input signal during a sample mode and holds it fixed during a hold mode to the instantaneous value of the signal at each transition from the sample to the hold mode. Typically, the ADC 18 used to digitize the RXA1 and RXA2 signals to produce signals RXD1 and RXD2, respectively, is an oversampling converter comprising an input signal conditioning circuit, a differential fifth order delta-sigma modulator, a 64× oversampling decimation circuit from which output signals pass to a serial interface 25 (see FIG. 3). A typical sampling rate for both converters 16 and 18 is at least 2.5 times the bit rate of the data being received, and in any case, is greater than the Nyquist rate.

Figure 3:
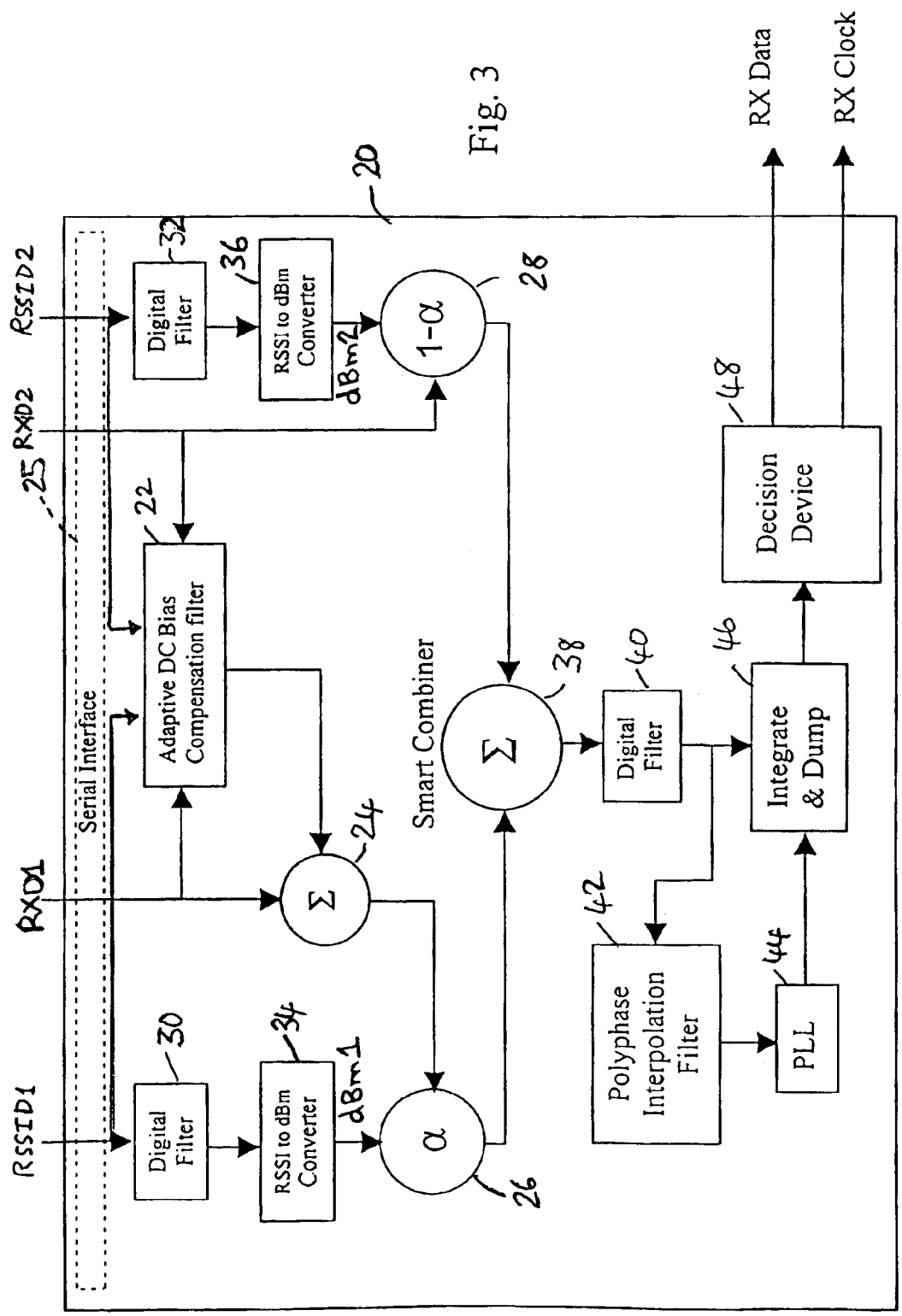
FIG. 3 is a schematic diagram of a digital signal processor implementing circuitry for processing signals received from the first and second receiving components of the wireless receiver; and, FIG. 4 is a graph illustrating the combination of received signals.

Referring now to FIG. 3, a digital signal processor (DSP) 20 is used to implement, through suitable programming and techniques well known to those skilled in the art of DSP selection and programming, a combiner in accordance with the invention having the components shown in FIG. 3. With reference to this illustration, however, it is to be noted that the illustrated embodiment is directed to an FM modulation scheme using a limiter-discriminator-type demodulator (e.g. for a frequency in the 450–800 MHZ range) and a hardware implementation of the demodulator is used. Alternatively, for some embodiments it could instead be chosen to implement portions of the demodulator by a DSP. Also, for alternative embodiments other modulation schemes may be selected at the same or different frequency ranges and the receivers for such embodiments may make more extensive use of a DSP than the embodiment shown in FIG. 3. All references herein to a component refer to circuitry and the circuitry described herein may, for some embodiments, be implemented and provided by a DSP.

For the DSP processing shown by FIG. 3, the digitized inputs RXD1 and RXD2 are applied to an adaptive DC bias compensation filter 22 which compares their DC levels and applies a compensation signal to one of the signals through an adder 24 so as to adjust the relative DC levels of the received demodulated data signals. This compensation is done in all cases and, in addition, in cases where both of the data signals are above a predetermined DC bias compensation threshold such as, for example, −80 dBm, the DC level of the compensation signal used to do so is calibrated (i.e. adjusted). This calibration is done by applying a single pole digital filter to the difference of the digitized inputs RXD1 and RXD2. The purpose of the DC compensation circuitry is to compensate for differences in frequency, modulation level and other factors which may influence the DC bias levels of demodulated signals from the channels received.

The DC-processed RXD signals are then passed to multiplier circuitry, in which they are multiplied in a ratio $\alpha$: $1-\alpha$ a in multipliers 26, 28 whereby the RSSI signals determine the control signals $\alpha$ and $1-\alpha$, with the control signal a being produced by generating means provided by the DSP. The RSSI signals pass through evaluating means, provided by digital filters 30, 32 and converter circuits 34, 36, which adjust them to signals proportional to the dBm levels of the original RSSI signals, these signals being shown in FIG. 3 as dBm1 and dBm2. The multipliers are only enabled when dBm1 and dBm2 are both: (i) above a predetermined strength threshold level referred to herein as a combiner threshold (for example −123 dBm) below which reliable demodulation is not possible; and, (ii) differ by less than a predetermined margin, the margin preferably being programmable between 3 and 12 dB and a margin of 6 dB being selected for the embodiment described herein. The RXD signals are summed by combiner circuitry 38 to provide a combined RXD signal according to the following expression, provided that the dBm1 and dBm2 signals differ by less than the margin (e.g. 6 dB):

RXD combined=a×RXD1+(1−a)×RXD2 where $0 \leq \alpha \leq 1$ and $\alpha = 0.5 + (dBm1-dBm2)/(2 \times margin)$ where margin=6 dB (for the illustrated embodiment described herein).

The combiner is controlled to provide various different results according to the dBm1 and dBm2 values. If there is more than one RSSI signal above the threshold at which the multipliers are operative, and the strengths of these signals differ by less than 6 dB, a linear combination of the RXD signals is effected according to the above expression. This results in a simple averaging of the adjusted RXD signals if the RSSI signals are equal.

A signal whose RSSI is more than 6 dB below that of the strongest signal is normally ignored. However, when an FM wireless modulation scheme and a demodulation hard-limiting circuit are used, a special type of degradation may occur. This is when rapid signal fading happens and results in a high negative slope followed by a high positive slope on the RSSI signal. In this case, even if the fading channel signal has a higher power level than the other(s), the lower power signal(s) may be less degraded. To handle this phenomenon the second derivative of the RSSI signal is, firstly, calculated using a digital filter which is provided as part of the converters 34,36. Secondly, the RSSI signal is added with this second derivative multiplied by an appropriate scaling factor. The resulting dBm1 and dBm2 signals are biased in such a way that the combining factor $\alpha$ accounts for this effect when it is calculated.

The decoding of the digital signals is done in many stages and, as will be recognized by persons skilled in the art, those stages will differ depending on the modulation scheme to be selected for use. The combining process of the present invention has to take place at a stage where the information symbols are similar enough that they may be combined linearly according to the combiner circuitry described herein. In the illustrated embodiment the combiner circuitry is operative at the initial stage of decoding but for other modulation schemes, such as QAM (Quadrature Amplitude Modulation), this combining process must be done further down the parallel decode process of the invention, for example, after symbol alignment and amplitude normalization.

Figure 4:
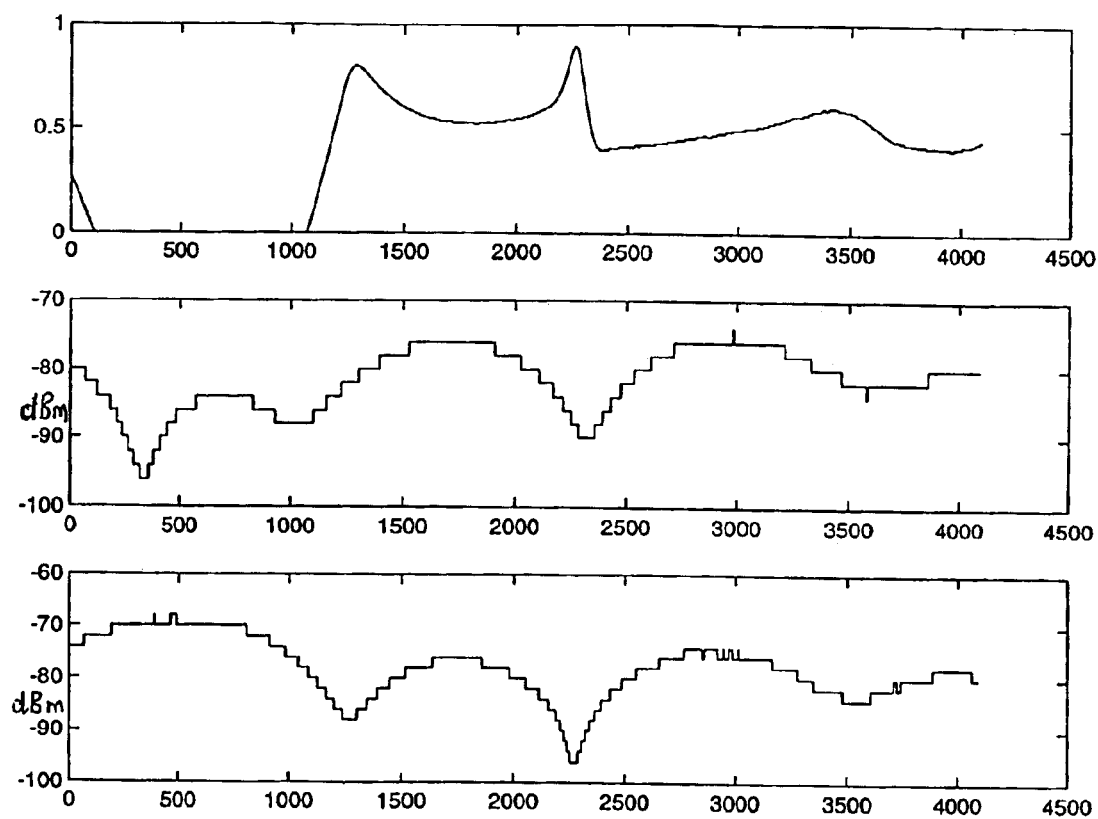

FIG. 4 illustrates the operation of the combiner. The lower two graphs plot the outputs of the converters 34,36 for two channels through successive samples, while the uppermost graph illustrates the proportions in which the RXD signals are combined by the combiner circuit 38 with 1 representing a combination entirely formed by the upper channel, and 0 representing a combination formed entirely by the lower channel. Thus, along the time axis of the graphs, the signal of the lower channel from about 100 to 1100 is more than 6 dB greater than that from the upper channel, so a equals 0 and the lower channel alone is selected (i.e. in this case only the stronger signal is selected). At around 1700, both signals are of similar strength ($\alpha=0.5$) and they are thus simply averaged. At about 2300, the signals differ by just less than 6 dB, with the upper channel greater, and a linearly apportioned output is taken, according to 0.9 from the upper channel and 0.1 from the lower channel. It should be noted that the combiner works on a sample-by-sample basis (the samples being the digital output produced by blocks 16 and 18 at a rate Fs) and thus the operation of the combiner is controlled by the RSSI signals over the period of a sample.

To recover the original digital signal in accordance with normal recovery processing methods, the output from the combiner circuit 38 is passed to a digital filter 40, and thence to a polyphase interpolation filter 42 whose purpose is to provide an accurate interpolation of an original signal produced by a Nyquist sampling process. It uses an oversampling process to interpolate additional points to a curve reconstructing the original signal. The oversampled signal reduces timing jitter, as compared to the Nyquist sampled signal, and enables more accurate recovery of symbol timing by a phase-locked loop 44 implemented by the DSP, which loop provides a timing output to an integrate and dump module 46 implemented by the DSP.

The output provided by the integrate and dump module 46 for each symbol is passed to a decision circuit 48 which evaluates the symbol, typically based upon a decision feedback method in which both the value of the output and the decisions made in respect of previous symbols are used to provide a most likely estimate of the symbol being decoded.

It will be noted that, in operation, the digital signal processor continuously evaluates, in parallel, the signals received by each receiving component utilised, and combines data from these signals such as to recover and combine information from each channel deemed able to contribute to correct evaluation of the received data. The evaluation tests and combination techniques described above are those presently believed to provide the best chance of correctly evaluating symbols of a data transmission, but these may be varied within the scope of the appended claims with a view either to improving performance, simplifying implementation, or taking advantage of improved DSP or other technology used to implement the digital circuits of the receiver. Although it is considered that use of a suitably programmed DSP is presently the optimum technology for implementing digital functions of the invention, other technology capable of implementing the same functions may, of course, be used. The individual circuit functions and processing functions utilised in the receiver are, individually, well understood by those skilled in the art, and although particular implementations of these functions may have been described, it should be understood that functionally equivalent or superior implementations may be substituted. Likewise, particular functions may be performed at different points in the receiver if functionally equivalent results are obtained.

What is claimed is:

1. A combiner for use in a spatial diversity radio receiver which receives multiple data signals through spaced apart antennae, said combiner comprising, for two received data signals:
   (a) means for receiving two strength-indicative signals, each said strength-indicative signal being indicative of a strength of one of said two received data signals, and two demodulated data signals for each said two received data signals;
   (b) means for generating control signals responsive to said strength-indicative signals; and,
   (c) means for combining said demodulated data signals in specific proportions determined by said control signals where said demodulated data signals are above a predetermined combiner threshold, to provide a combined output data signal, said specific proportions being:
      (i) where a difference between strengths of said demodulated data signals is more than a predetermined margin:
         100% of only a strongest of said demodulated data signals; and,
      (ii) where said difference between strengths of said demodulated data signals is less than said predetermined margin:
         for said demodulated data signal which is a strongest of said demodulated data signals, 50% plus a second percentage corresponding to a ratio between one-half of said difference between strengths and said predetermined margin; and,
         for said other demodulated data signal, 50% less said second percentage.

2. A combiner according to claim 1, wherein said margin is between 3 dB and 12 dB.

3. A combiner according to claim 2, wherein said margin is 6 dB.

4. A combiner according to claim 3, wherein said generating and combining means are provided by a digital signal processor.

5. A combiner according to claim 4, wherein said generating means comprises means for evaluating said strength-indicative signals.

6. A combiner according to claim 5, wherein said evaluating means comprises means for producing a second derivative signal for each said strength-indicative signal and said control signals are generated according to a predetermined combination of said strength-indicative signals and second derivative signals.

7. A combiner according to claim 5, and further comprising DC bias compensation means for adjusting the relative DC levels of the received demodulated data signals wherein said compensation means calibrates a level of a DC offset signal used for said adjusting when the strengths of said demodulated data signals are above a predetermined DC bias compensation threshold.

8. A combiner for use in a spatial diversity radio receiver which receives multiple data signals through spaced apart antennae, said combiner comprising, for two received data signals:
   (a) a receiving component configured for receiving strength-indicative signals, each of two said strength-indicative signal being indicative of a strength of one of said two received data signals, and a demodulated data signal for each said two received data signals;
   (b) a control signal generating component configured for generating control signals responsive to said strength-indicative signals; and,
   (c) a combining component configured for combining said demodulated data signals in specific proportions determined by said control signals where said demodulated data signals are above a predetermined combiner threshold, to provide a combined output data signal, said specific proportions being:
      (i) where a difference between strengths of said demodulated data signals is more than a predetermined margin:
         100% of only a strongest of said demodulated data signals; and,
      (ii) where said difference between strengths of said demodulated data signals is less than said predetermined margin:
         for said demodulated data signal which is a strongest of said demodulated data signals, 50% plus a second percentage corresponding to a ratio between one-half of said difference between strengths and said predetermined margin; and,
         for said other demodulated data signal, 50% less said second percentage.

9. A spatial diversity radio receiver comprising: (a) multiple receiving components for receiving data signals through antennae, each said antenna associated with one said receiving component and being spaced apart a predetermined distance, each said receiving component comprising circuitry for providing a signal indicative of the strength of said received data signal and a demodulated data signal; (b) a combiner according to claim 1; and, (c) circuitry for evaluating said combined output data signal.

10. A spatial diversity radio receiver comprising: (a) multiple receiving components for receiving data signals through antennae, each said antenna associated with one said receiving component and being spaced apart a predetermined distance, each said receiving component comprising circuitry for providing a signal indicative of the strength of said received data signal and a demodulated data signal; (b) a combiner according to claim 2; and, (c) circuitry for evaluating said combined output data signal.

11. A spatial diversity radio receiver comprising: (a) multiple receiving components for receiving data signals through antennae, each said antenna associated with one said receiving component and being spaced apart a predetermined distance, each said receiving component comprising circuitry for providing a signal indicative of the strength of said received data signal and a demodulated data signal; (b) a combiner according to claim 6, and, (c) circuitry for evaluating said combined output data signal.

12. A spatial diversity radio receiver comprising: (a) multiple receiving components for receiving data signals through antennae, each said antenna associated with one said receiving component and being spaced apart a predetermined distance, each said receiving component comprising circuitry for providing a signal indicative of the strength of said received data signal and a demodulated data signal; (b) a combiner according to claim 7; and, (c) circuitry for evaluating said combined output data signal.

13. A spatial diversity radio receiver comprising: (a) multiple receiving components for receiving data signals through antennae, each said antenna associated with one said receiving component and being spaced apart a predetermined distance, each said receiving component comprising circuitry for providing a signal indicative of the strength of said received data signal and a demodulated data signal; (b) a combiner according to claim 8; and, c) circuitry for evaluating said combined output data signal.

* * * * *